Oct. 16, 1923.  
M. L. LIVELY  
1,470,854  
RAT TRAP  
Filed April 10, 1923

M. L. Lively,  
Inventor.

Attorneys

Patented Oct. 16, 1923.

1,470,854

UNITED STATES PATENT OFFICE.

MARION LUTHER LIVELY, OF ATLANTA, GEORGIA.

RAT TRAP.

Application filed April 10, 1923. Serial No. 631,204.

*To all whom it may concern:*

Be it known that I, MARION LUTHER LIVELY, a citizen of the United States, residing at Atlanta, in the county of Fulton and State of Georgia, have invented a new and useful Rat Trap, of which the following is a specification.

This invention relates to animal traps and is more particularly designed for capturing rodents.

The object of the invention is to provide a trap of this character which is strong and quick acting, being equipped with a trigger controlled plunger for clampingly catching the animal and killing it.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
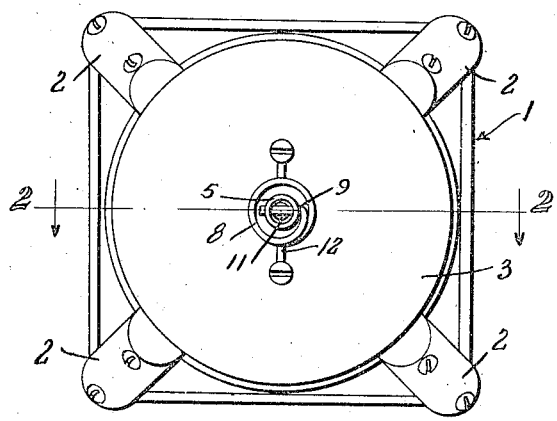
Figure 1 represents a top plan view of a trap constructed in accordance with this invention.
Figure 2:
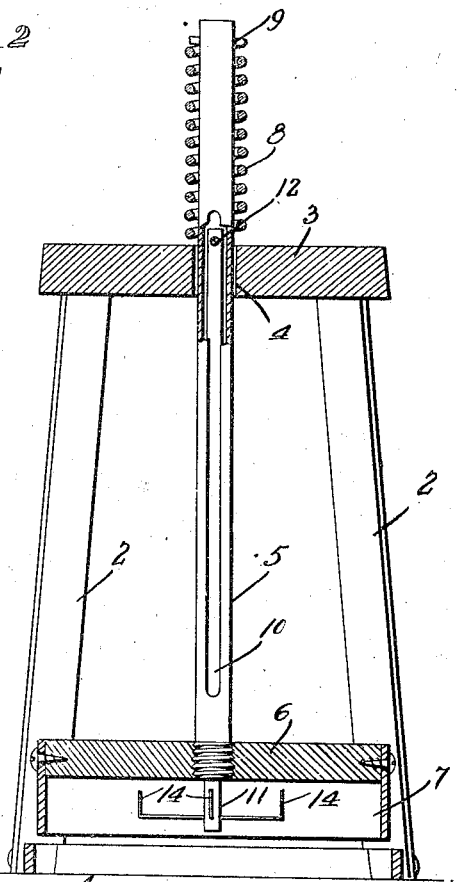
Fig. 2 is a longitudinal vertical section thereof taken on the line 2—2 of Fig. 1.

In the embodiment illustrated, a supporting base 1 is shown having a plurality of supporters 2 rising therefrom and supporting at their upper ends, a plate-like top 3 having a centrally disposed aperture 4 in which is mounted to reciprocate a tubular rod 5. This rod 5 has threaded connection at its lower end with a disk-like plate or plunger 6 to the periphery of which is secured a depending metallic skirt 7 shown clearly in Fig. 2. This skirt 7 is designed to strike the animal from above when the trigger is released and clamp it between the base 1 and said skirt.

Figure 3:
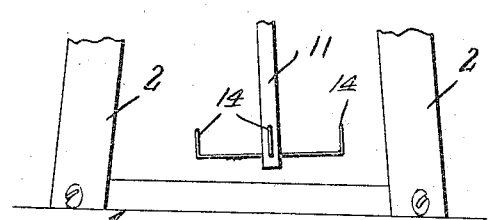
Fig. 3 is a side elevation with parts broken out and in section.

A heavy wire spring 8 encircles the tube 5 above the top 3 being secured at one end to said top and at the other end to the rod 5 as shown at 9, the spring end extending transversely through the rod. This spring is secured to the top 3 so that when the member 5 is raised into the setting position shown in Fig. 3, it will be placed under tension for springing the trap in a manner presently to be described.

A bait carrying trigger rod 11 is swingably mounted in the top 3 by means of a wire or cross bar 12, the ends of which are secured to the top 3 and extend through oppositely disposed slots 10 formed in the tube 5 so that said tube may be raised and lowered without being retarded by the trigger. This trigger rod 11 has a shoulder 13 near its pivoted end which is designed to hook under the lower face of the disk-like plate or plunger 6 when the latter is raised to the position shown in Fig. 3 and in which position said plunger will be held by said trigger until it is moved laterally a sufficient distance to release the shoulder from engagement therewith. This mounting of the plunger expands the spring 8, putting it under tension so that when the plunger is released, the spring will move it forcibly downward causing the skirt or band 7 thereof to catch the animal between it and the base 1.

The trigger rod 11 extends downwardly to a point near the platform or base 1 and is provided with a plurality of bait holding fingers 14 on which the bait is impaled and securely held so that when the rat or other animal attempts to remove it, the rod 11 will be swung laterally and release the shoulder 13 from the plunger 6 which will quickly descend and trap the animal.

From the above description it will be obvious that the trap constructed as herein shown and described is simply and easily set and yet has ample strength to kill comparatively large animals.

Various changes in the form, shape, proportion and other minor details of construction may be made without departing from the spirit or sacrificing any of the advantages of the claimed invention.

I claim:—

1. A trap of the class described comprising a supporting structure, a spring projected plunger mounted therein, a bait carrying trigger rod extending loosely through said plunger and having means to releasably engage it, a tubular member carried by said plunger in which said rod operates, and a coiled spring connected with said tubular member and with the structure whereby the spring is placed under tension when the plunger is retracted, said trigger rod being movable laterally to release the plunger.

2. In a device of the class described, a supporting base having standards rising therefrom, a top member carried by said standards, a tube slidably mounted in said top, a plunger carried by said tube below said top, a trigger rod pivotally mounted in said top and on which said tube slides, said tube having oppositely disposed longitudinally extending slots for the passage of the pivot of the trigger, and a metal skirt carried by said plunger to forcibly strike the trapped animal for killing it.

3. In a trap of the class described, a supporting base, standards rising therefrom, a top mounted in said standards and centrally apertured, a depending trigger pivotally mounted in said aperture and having bait carrying fingers at its lower end, a plunger mounted to reciprocate in said structure and having a tubular rod encircling said trigger rod, a coiled spring encircling said plunger rod above said top and connected at one end to the rod and at the other end to the top whereby the spring is placed under tension elevating the plunger, the trigger having a shoulder to engage the plunger to releasably hold it in elevated position, said trigger being movable laterally to release the plunger.

In testimony that I claim the foregoing as my own, I have hereto affixed my signature in the presence of two witnesses.

MARION LUTHER LIVELY.

Witnesses:
ROBERT J. SMITH,
GEO. T. HUDSON.